US009534319B2

(12) United States Patent
Tour et al.

(10) Patent No.: US 9,534,319 B2
(45) Date of Patent: Jan. 3, 2017

(54) DISSOLUTION OF GRAPHITE, GRAPHITE AND GRAPHENE NANORIBBONS IN SUPERACID SOLUTIONS AND MANIPULATION THEREOF

(75) Inventors: James M. Tour, Bellaire, TX (US); Matteo Pasquali, Houston, TX (US); Natnael Behabtu, Wilmington, DE (US); Jay R. Lomeda, Los Alamos, NM (US); Dmitry V. Kosynkin, Dhahran (SA); Amanda Duque, Los Alamos, NM (US); Micah J. Green, Lubbock, TX (US); A. Nicholas Parra-Vasquez, Bordeaux (FR); Colin Young, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 857 days.

(21) Appl. No.: 13/202,352

(22) PCT Filed: Feb. 19, 2010

(86) PCT No.: PCT/US2010/024754
§ 371 (c)(1),
(2), (4) Date: Dec. 1, 2011

(87) PCT Pub. No.: WO2010/096665
PCT Pub. Date: Aug. 26, 2010

(65) Prior Publication Data
US 2012/0063988 A1 Mar. 15, 2012

Related U.S. Application Data

(60) Provisional application No. 61/153,873, filed on Feb. 19, 2009, provisional application No. 61/177,159, filed on May 11, 2009.

(51) Int. Cl.
| | | |
|---|---|---|
| C01B 31/00 | (2006.01) |
| C08L 77/10 | (2006.01) |
| C08L 79/00 | (2006.01) |
| D01F 9/12 | (2006.01) |
| B29C 47/00 | (2006.01) |
| B05D 3/02 | (2006.01) |
| C08K 3/30 | (2006.01) |
| C01B 31/04 | (2006.01) |
| B82Y 30/00 | (2011.01) |
| B82Y 40/00 | (2011.01) |
| D01D 1/02 | (2006.01) |
| D01D 5/04 | (2006.01) |

(52) U.S. Cl.
CPC .............. *D01D 1/02* (2013.01); *B82Y 30/00* (2013.01); *B82Y 40/00* (2013.01); *C01B 31/04* (2013.01); *C01B 31/043* (2013.01); *C01B 31/0469* (2013.01); *C01B 31/0484* (2013.01); *D01D 5/04* (2013.01); *D01F 9/12* (2013.01)

(58) Field of Classification Search
CPC .............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36
USPC .......... 423/447.1–447.3, 445 B, 448, 415.1; 977/742–745, 842–848; 428/367; 106/286.8; 524/606, 612, 611; 264/176.1, 264/299
See application file for complete search history.

(56) References Cited

U.S. PATENT DOCUMENTS

| 3,404,061 | A | * | 10/1968 | Bochman et al. ............ 428/143 |
|---|---|---|---|---|
| 4,895,713 | A | | 1/1990 | Greinke et al. |
| 2001/0010809 | A1 | * | 8/2001 | Haddon et al. ............ 423/447.2 |
| 2003/0170166 | A1 | | 9/2003 | Smalley et al. |
| 2007/0041887 | A1 | * | 2/2007 | Veedu et al. ............... 423/447.2 |
| 2007/0280876 | A1 | | 12/2007 | Tour et al. |

(Continued)

FOREIGN PATENT DOCUMENTS

WO       2009058855       5/2009

OTHER PUBLICATIONS

Chung, Review Exfoliation of graphite, Journal of Materials Science 1987; 22: 4190-4198.*

(Continued)

*Primary Examiner* — Daniel C McCracken
(74) *Attorney, Agent, or Firm* — Winstead PC

(57) ABSTRACT

Methods for dissolving carbon materials such as, for example, graphite, graphite oxide, oxidized graphene nanoribbons and reduced graphene nanoribbons in a solvent containing at least one superacid are described herein. Both isotropic and liquid crystalline solutions can be produced, depending on the concentration of the carbon material The superacid solutions can be formed into articles such as, for example, fibers and films, mixed with other materials such as, for example, polymers, or used for functionalization of the carbon material. The superacid results in exfoliation of the carbon material to produce individual particles of the carbon material. In some embodiments, graphite or graphite oxide is dissolved in a solvent containing at least one superacid to form graphene or graphene oxide, which can be subsequently isolated. In some embodiments, liquid crystalline solutions of oxidized graphene nanoribbons in water are also described.

23 Claims, 12 Drawing Sheets

(56) References Cited

U.S. PATENT DOCUMENTS

2008/0260616 A1 10/2008 Tour et al.
2008/0277627 A1 11/2008 Veedu et al.

OTHER PUBLICATIONS

Machine Tranlsation of Melin, et al., Action sur le Graphite des Solutions de Chlorures dans l'Acide Chlorosulfonique, Materials Science and Engineering 1977; 31: 61-65.*
Flint, et al., The Temperature of Cavitation, Science 1991; 253(5026): 1397-1399.*
Viculis, et al., Intercalation and exfoliation routes to graphite nanoplatelets, J. Mater. Chem. 2005; 15: 974-978 Melin, et al., Action sur le Graphite des Solutions de Chlorunes dans l'Acide Chlorosolfonique, Materials Science and Engineering 1977; 31: 61-65.*
Melin, et al., Action sur le Graphite des Solutions de Chlorunes dans l'Acide Chlorosolfonique, Materials Science and Engineering 1977; 31: 61-65.*
Iskander, et al., Action de l'acide disulfurique sur le graphite, Carbon 1983; 21(2): 167.*
Chlorosulfonic acid, accessed online at https://cameochemicals.noaa.gov/report?key=CH5911 on Apr. 2, 2016.*
Fitzer, et al., Recommended Terminology for the Description of Carbon as a Solid, Pure & Appl. Chem. 1995; 67(3): 473-506.*
Geim et al., The rise of graphene, Nature Materials, vol. 6, Mar. 2007, 183-191.
Novoselov et al., Two-dimensional atomic crystals, PNAS, vol. 102, No. 30, Jul. 2005, 10451-10453.
Ramesh et al., Dissolution of Pristine Single Walled Carbon Nanotubes in Superacids by Direct Protonation, J. Phys. Chem. B, 2004, 108 (26), 8794-8798.
McAllister et al., Single Sheet Functionalized Graphene by Oxidation and Thermal Expansion of Graphite, Chem Mater 2007, 19, 4396-4404.
Ruoff, R., Graphene: calling all chemists, Nature Nanotech. 3, 10-11 (2008).
International Preliminary Report on Patentability for PCT/US2010/024754, mailed on Sep. 1, 2011.
Melin, J. et al., Action sur le graphite des solutions de chlorures dans l'acide chlorosulfonique, Mater. Sci. Eng. 31, 61-65 (1977).
Duque et al., Diameter-Dependent Solubility of Single-Walled Carbon Nanotubes, ACS Nano, 2010, vol. 4, No. 6, 3063-3072.
Rai et al., Solubility and Size Separation of Large Fullerenes in Concentrated Sulfuric Acids, J. Phys. Chem. C, 2007, 111, 17966-17969.
Li et al.,Processable aqueous dispersions of graphene nanosheets, Nature Nanotechnology 3, 101-105 (2008).
Touzain, P., Compose d'insertion graphite-acide fluorosulfurique, Carbon, 1978, 16:403.
Paredes et al., Graphene Oxide Dispersions in Organic Solvents, Langmuir, 2008, 24 (19), 10560-10564.
Stankovich, S. et al., Graphene-based composite materials, Nature 442, 282-286 (2006).
Stankovich, S. et al., Synthesis of graphene-based nanosheets via chemical reduction of exfoliated graphite oxide, Carbon 45, 1558-1565 (2007).
Hummers, W. S. et al., Preparation of graphitic oxide., J. Am. Chem. Soc. 80, 1339 (1958).
Carder et al., Graphite intercalation studies in fluorosulfuric acid as solvent, Synthetic metals, vol. 30, Issue 1, Apr. 1989, pp. 9-21.
Hernandez, Y. et al., High-yield production of graphene by liquid-phase exfoliation of graphite, Nature Nanotech. 3, 563-568 (2008).
Lotya, M. et al., Liquid phase production of graphene by exfoliation of graphite in surfactant/water solutions., J. Am. Chem. Soc. 131, 3611-3620 (2009).
Valles, C. et al., Solutions of negatively charged graphene sheets and ribbons, J. Am. Chem. Soc. 130, 15802-15804 (2008).
Segal, M., Selling graphene by the ton, Nature Nanotech. 4, 612-614 (2009).
Melin, J. et al., Action sur le graphite des solutions de chlorures dans l'acide chlorosulfonique, Mater. Sci. Eng. 31, 61-65 (1977) [Original and Translated Versions Included].
B. Iskander , et al., Action de l'acide disulfurique sur le graphite, Carbon, 1983, vol. 21, Issue 2, 1983, p. 167 [Original and Translated Versions Included].
International Search Report and Written Opinion for PCT/US2010/024754 dated Jun. 29, 2010.

* cited by examiner

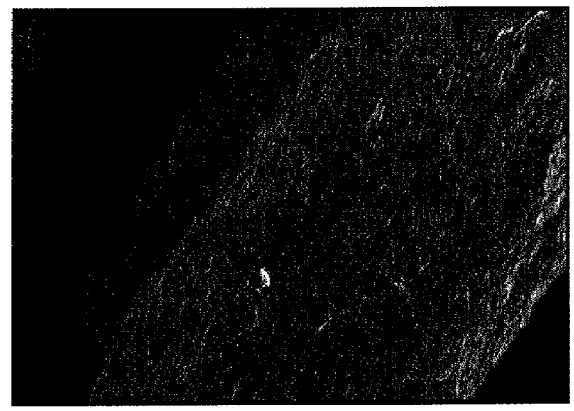
FIG. 16
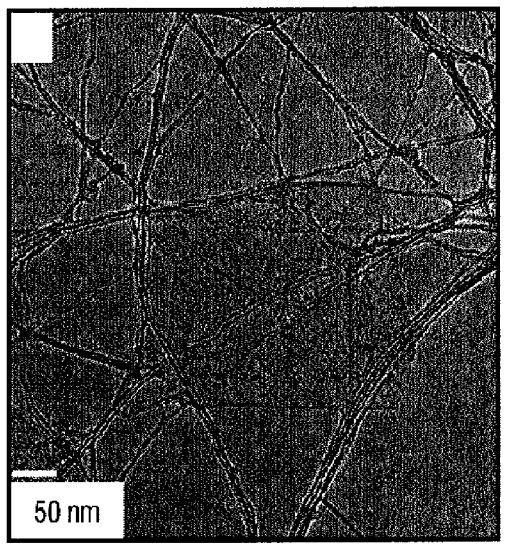 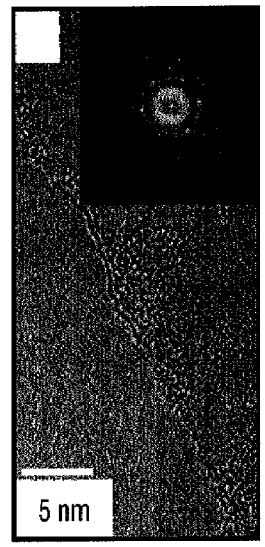 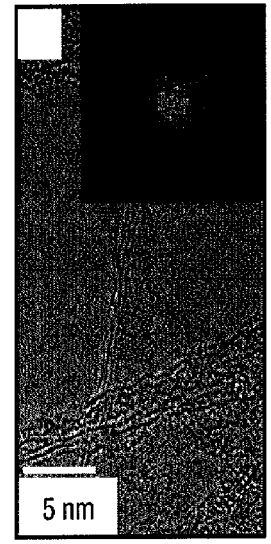
FIG. 17A     FIG. 17B     FIG. 17C

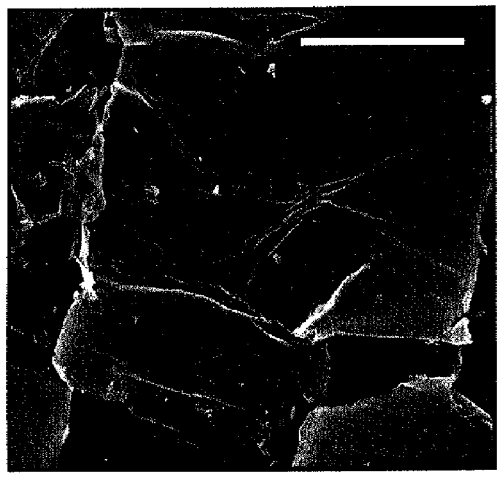
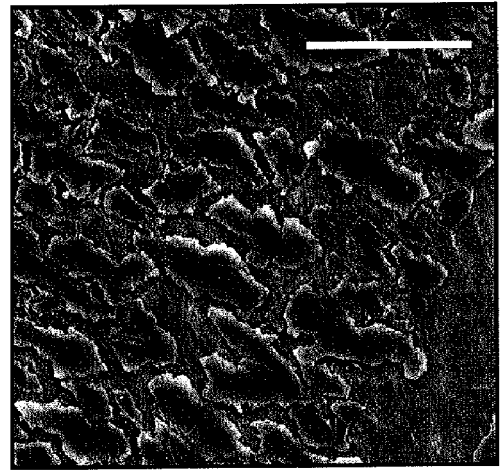
FIG. 19A  FIG. 19B
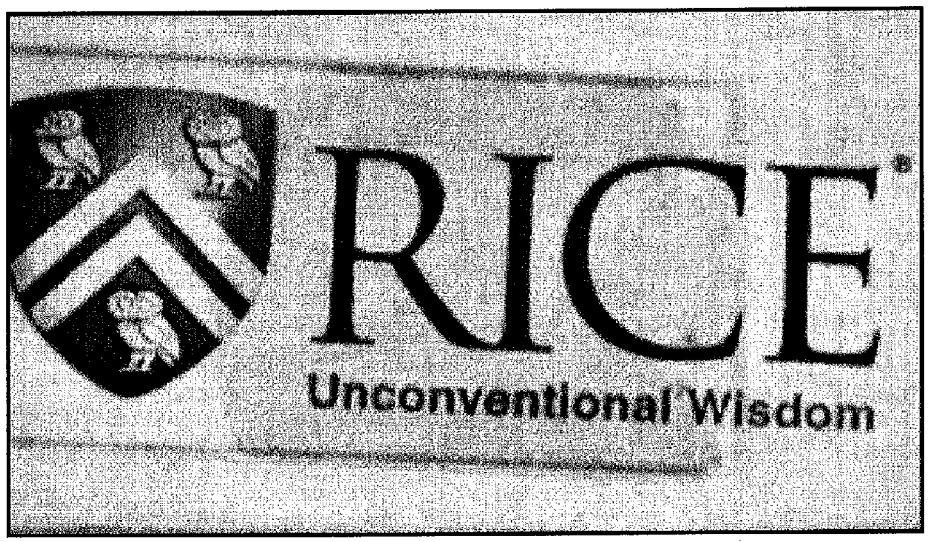
FIG. 20

DISSOLUTION OF GRAPHITE, GRAPHITE AND GRAPHENE NANORIBBONS IN SUPERACID SOLUTIONS AND MANIPULATION THEREOF

CROSS-REFERENCE TO RELATED APPLICATIONS

This application claims priority to U.S. provisional patent applications 61/153,873, filed Feb. 19, 2009, and 61/177,159, filed May 11, 2009, each of which is incorporated by reference in its entirety herein.

STATEMENT REGARDING FEDERALLY SPONSORED RESEARCH

This invention was made with Government support under grant number FA9550-06-1-0207 awarded by the U.S. Department of Defense, grant number FA8650-07-2-5061 awarded by the U.S. Department of Defense, grant number FA9550-09-1-0590 awarded by the U.S. Department of Defense, grant number FA8650-05-D-5807 awarded by the U.S. Department of Defense, grant number FA8650-05-D-5807 awarded by the U.S. Department of Defense, grant number W912 HZ-08-C-0054 awarded by the U.S. Department of Defense, and grant number 2007-G-010 awarded by the Federal Aviation Administration. The Government has certain rights in the invention.

BACKGROUND

Graphene and related materials such as, for example, graphene nanoribbons hold great promise for applications in a number of technical fields due to their favorable electronic, mechanical and thermal properties. Many of the proposed applications would be facilitated by having available both 1) access to bulk quantities of graphene or graphene nanoribbons and 2) means for forming a high-concentration solution thereof.

Graphene can be produced by manual exfoliation of graphite, although this process is exceedingly low yielding and inefficient. Graphene can also be chemically produced from graphite by oxidation and exfoliation to produce oxidized graphene, followed by chemical or catalytic reduction to reduce the graphene back to near its original state. Although this process is somewhat scalable, the electrical and thermal properties of the reduced graphene generally do not wholly replicate those of unexfoliated graphite. Oxidized or reduced graphenes can also be further chemically functionalized to improve their solubility in conventional organic solvents.

Formation of high-concentration solutions (>a few tens of ppm) of graphene and graphene nanoribbons, even in the presence of surfactants or other dispersants, has not been presently realized. Furthermore, even when a solution can be formed, the graphene or graphene nanoribbons are often not well dispersed as individual particles within the solution. Agglomeration into bulk particles not only hampers dissolution, but it also partially degrades the beneficial structural and electrical properties of these carbon materials. Conventional methods to solubilize carbon materials such as graphene and graphene nanoribbons also typically utilize sonication to facilitate solubilization. Such sonication is typically thought to break apart or otherwise damage graphene and graphene nanoribbon particles, and this method accordingly places an upper limit on particle size that can be attained.

In view of the foregoing, methods to produce high-concentration solutions of graphene and graphene nanoribbons would be beneficial in the art. Such high-concentration solutions would permit ready processing of graphene and graphene nanoribbons into various articles such as, for example, films, fibers, polymer composites and shaped articles containing primarily or solely graphene or graphene nanoribbons. Ideally, such methods would not chemically modify or otherwise damage the graphene or graphene nanoribbons such that the aforementioned beneficial properties of the pristine carbon materials can be maintained.

SUMMARY

In various embodiments, methods described herein include providing a carbon material such as, for example, graphite, graphite oxide, oxidized graphene nanoribbons, or reduced graphene nanoribbons and dissolving the carbon material in a solvent to form a solution. The solvent includes at least one superacid.

In other various embodiments, methods described herein include providing a carbon material such as, for example, graphite, graphite oxide, oxidized graphene nanoribbons, or reduced graphene nanoribbons and dissolving the carbon material in a solvent to form an isotropic solution. The solvent includes at least one superacid.

In other various embodiments, methods described herein include providing a carbon material such as, for example, graphite, graphite oxide, oxidized graphene nanoribbons, or reduced graphene nanoribbons and dissolving the carbon material in a solvent to form a liquid crystalline solution. The solvent includes at least one superacid.

In some embodiments, methods of the present disclosure include providing oxidized graphene nanoribbons, dissolving the oxidized graphene nanoribbons in a solvent to form a liquid crystalline solution, forming an article from the liquid crystalline solution, and removing the solvent from the article. The article includes a neat form of the oxidized graphene nanoribbons.

In some embodiments, methods described herein include dissolving graphite in a solvent to form a solution containing a graphene. The solvent includes at least one superacid and dissolving involves exfoliating the graphite to form the graphene.

In some embodiments, methods described herein include dissolving graphite oxide in a solvent to form a solution containing an oxidized graphene. The solvent includes at least one superacid and dissolving involves exfoliating the graphite oxide to form the oxidized graphene.

In still other embodiments, solutions described herein include a solvent and a carbon material dissolved in the solvent. The solvent includes at least one superacid and the carbon material may be, for example, graphite, graphite oxide, oxidized graphene nanoribbons, or reduced graphene nanoribbons.

In some embodiments, solutions described herein include oxidized graphene nanoribbons dissolved in water, wherein a concentration of the oxidized graphene nanoribbons is chosen such that the solution is at least partially liquid crystalline.

In yet additional various embodiments, articles containing exfoliated carbon materials are described herein. The exfoliated carbon materials includes, for example, graphene, oxidized graphene, oxidized graphene nanoribbons and reduced graphene nanoribbons.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 16 shows an illustrative SEM image of a fiber spun from a 19 wt. % oxidized graphene nanoribbon solution in water;

FIGS. 17A-17C show illustrative TEM images of exfoliated graphene in chlorosulfonic acid when filtered upon a bed of single-walled carbon nanotubes;

FIGS. 19A and 19B show illustrative SEM images of thin graphene films produced from GRAPHOIL and microcrystalline graphite;

FIG. 20 shows an image of an illustrative transparent thin film prepared from a graphite solution in chlorosulfonic acid;

DETAILED DESCRIPTION

Figure 1:
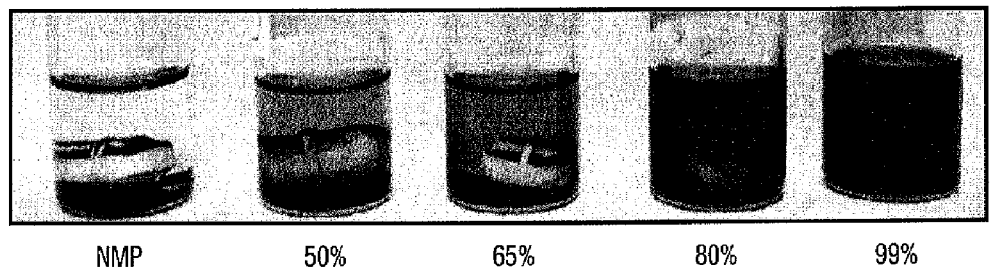
FIG. 1 shows images of illustrative graphite solutions dissolved in variable concentrations of chlorosulfonic acid/sulfuric acid.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

"Graphene nanoribbons," as defined herein, refer to, for example, single- or multiple layers of graphene (typically less than 10 carbon layers thick) that have an aspect ratio of greater than about 5, based on their length and their width. Graphene nanoribbons may be prepared in either oxidized or reduced forms. When not otherwise specified herein, the term graphene nanoribbons should be interpreted to encompass both oxidized graphene nanoribbons and reduced graphene nanoribbons. Methods for forming oxidized graphene nanoribbons and reduced graphene nanoribbons are described in U.S. patent application Ser. No. 12/544,017, filed Aug. 19, 2009, which is incorporated by reference herein in its entirety.

"Graphene," as defined herein, refers to, for example, a single graphite sheet that is typically less than about 10 carbon layers thick. As used herein, the terms graphene and graphene sheets are used synonymously. As used herein, the term 'graphene' will refer to, for example, graphene oxide, graphite oxide, chemically-converted graphene (i.e., reduced graphene), functionalized chemically-converted graphene and combinations thereof. Furthermore, it will understood that any of the embodiments described herein referencing a solution of graphite will be understood to contain graphene. As used herein, reduced forms of graphene and graphene nanoribbons still contain at least some of their carbon-carbon double bonds. Reduction of graphene and graphene nanoribbons, as described herein, refers to reduction of oxygen-containing functional groups on these moieties. Fully-reduced graphene containing carbon-carbon single bonds is referred to as "graphane".

"Graphene oxide," as defined herein refers to, for example, a specific form of graphite oxide typically less than about 10 carbon layers thick.

"Graphite oxide," as defined herein, refers to, for example, oxidized graphite having any number of carbon layers.

"Graphite," as defined herein, refers to, for example, an allotropic form of carbon characterized by numerous layers of $sp^2$-hybridized carbon atoms stacked upon one another.

"Graphitic," as defined herein, refers to, for example, graphene and graphite layers.

Graphite oxide referenced in any of the various embodiments described herein may be produced by any known method. In various embodiments, graphite oxide may be prepared by methods described in commonly-assigned published application WO 09/089,391 entitled "GRAPHENE COMPOSITIONS AND DRILLING FLUIDS DERIVED THEREFROM", which is incorporated herein by reference in its entirety.

Although several methods are now known for preparing exfoliated forms of graphite (e.g., graphene), graphite oxide (e.g., graphene oxide), and graphene nanoribbons, none of the heretofore described methods are capable of producing high concentration solutions of these carbon materials in the absence of a surfactant and/or sonication. As used herein, high concentration solutions will typically refer to solutions having a concentration greater than about 1000 ppm, although solutions having lower concentrations are also encompassed within the spirit and scope of the present disclosure. Methods of the present disclosure advantageously form solutions of these carbon materials at concentrations of 10- to 1000-fold and greater than those available with conventional methods. The limited solubility of the aforementioned carbon materials in conventional solvents seriously hinders their ability to be processed into articles such as, for example, fibers and films, or to be mixed with other materials such as, for example, polymers. Methods of the present disclosure advantageously facilitate such processing.

In various embodiments, methods described herein include providing a carbon material such as, for example, graphite, graphite oxide, or graphene nanoribbons and dissolving the carbon material in a solvent to form a solution. The solvent includes at least one superacid. In some embodiments, the solution is an isotropic solution. In other embodiments, the solution is a liquid crystalline solution.

Superacids suitable for practicing embodiments of the present disclosure include Brønsted superacids, Lewis superacids, and conjugate Brønsted-Lewis superacids. Brønsted superacids may include, for example, perchloric acid, chlorosulfonic acid, fluorosulfonic acid, trifluoromethanesulfonic acid, and higher perfluoroalkane sulfonic acids (e.g., $C_2F_5SO_3H$, $C_4F_9SO_3H$, $C_5F_{11}SO_3H$, $C_6F_{13}SO_3H$, and $C_8F_{17}SO_3H$, for example). Lewis superacids may include, for example, antimony pentafluoride and arsenic pentafluoride. Brønsted-Lewis superacids may include sulfuric acids containing various concentrations of $SO_3$, also known as oleums or fuming sulfuric acid. Other Brønsted-Lewis superacids may include, for example, polyphosphoric acid-oleum mixtures, tetra(hydrogen sulfate)boric acid-sulfuric acid, fluorosulfuric acid-antimony pentafluoride ("magic acid"), fluorosulfuric acid-$SO_3$, fluorosulfuric acid-arsenic pentafluoride, fluorosulfonic acid-hydrogen fluoride-antimony pentafluoride, fluorosulfonic acid-antimony pentafluoride-sulfur trioxide, fluoroantimonic acid, and tetrafluoroboric acid. In various embodiments of the methods presented herein, the solvent containing at least one superacid includes at least chlorosulfonic acid. In other various embodiments of the present disclosure, the solvent containing at least one superacid includes at least a mixture of chlorosulfonic acid and sulfuric acid.

Figure 2:
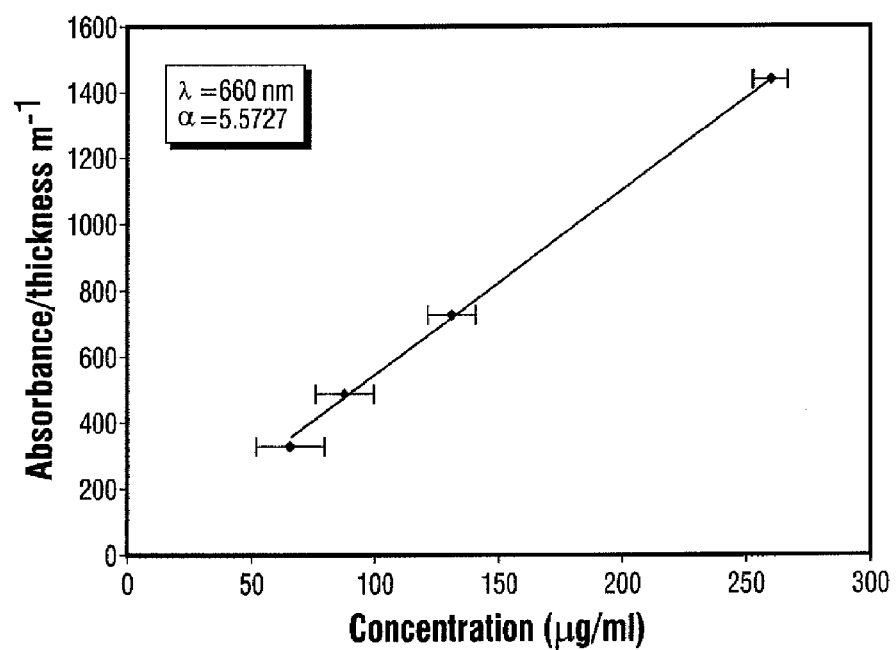
FIG. 2 shows an illustrative plot of absorbance at 660 nm versus concentration of dissolved graphite in a pristine chlorosulfonic acid solution.

In various embodiments, acid strength may be adjusted to modify the solubility of the carbon material in the solvent containing at least one superacid. In some embodiments, the acid strength may be adjusted by mixing a superacid with at least one other acid or an organic solvent such as, for example, dichloromethane, chloroform, or n-propyl bromide. For example, in some embodiments, chlorosulfonic acid may be mixed with variable amounts of sulfuric acid in order to decrease the acidity of pristine chlorosulfonic acid. FIG. 1 shows images of illustrative graphite solutions dissolved in variable concentrations of chlorosulfonic acid/sulfuric acid. A control image showing the essential lack of graphite solubility in N-methylpyrrolidone (NMP) in the absence of sonication is shown for comparison. NMP has shown to have some capacity for solubilizing graphite under the influence of sonication. As illustrated by the images of FIG. 1, the solutions become progressively darker as the acid strength is increased, indicative of a higher amount of dissolved graphite. FIG. 2 shows an illustrative plot of absorbance at 660 nm versus concentration of dissolved graphite in a pristine chlorosulfonic acid solution. The linearity of the plot indicates that the solutions obey the Beer-Lambert law.

The solubility of graphite in the form of graphene differs markedly from that of single-wall carbon nanotubes. Single-wall carbon nanotubes are at least partially soluble in superacids as weak as 102% sulfuric acid (oleum), but solubility increases markedly with increasing acid strength. In contrast, graphite is only sparingly soluble in chlorosulfonic acid/sulfuric acid mixtures below 80% chlorosulfonic acid content and much more soluble at higher acidities. Without being bound by theory or mechanism, Applicants believe that the increased solubility of single-wall carbon nanotubes results from curvature strain therein. Since the carbon materials of the present disclosure lack curvature strain, they generally necessitate higher acid strengths in order to be dispersed.

Figure 3:
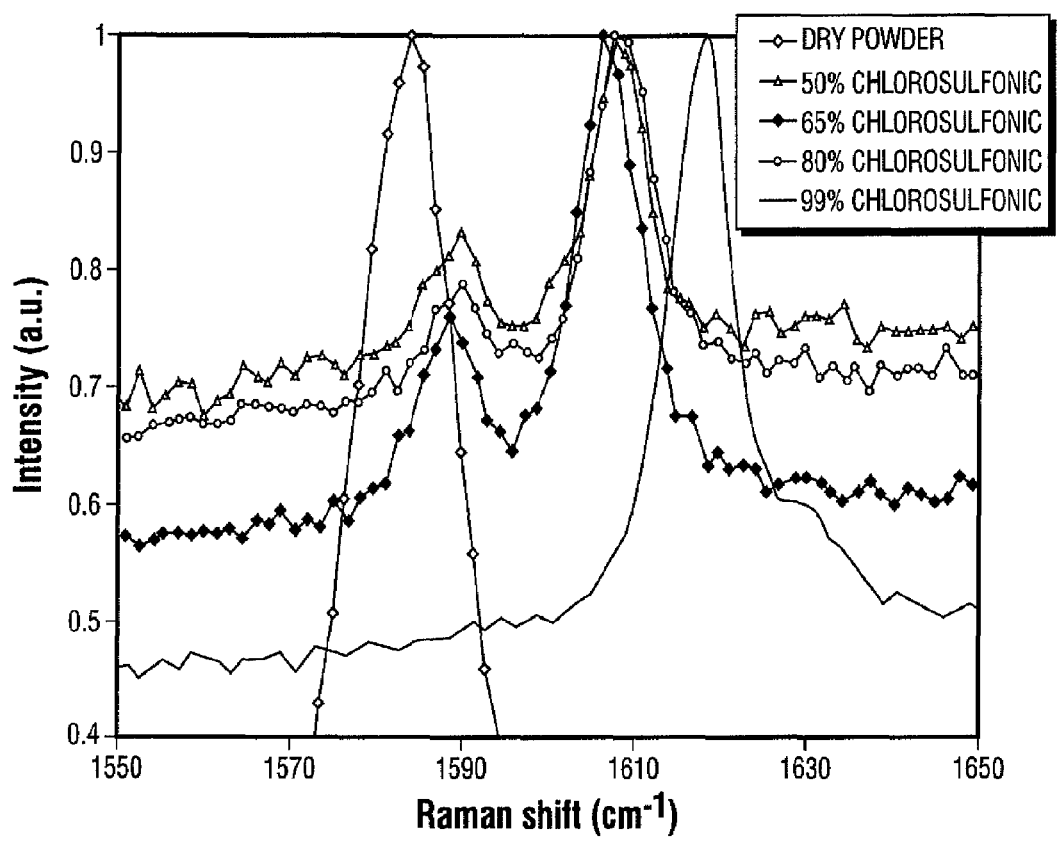
FIG. 3 shows illustrative Raman spectra of graphite dispersed in variable concentrations of chlorosulfonic acid.
Figure 4:
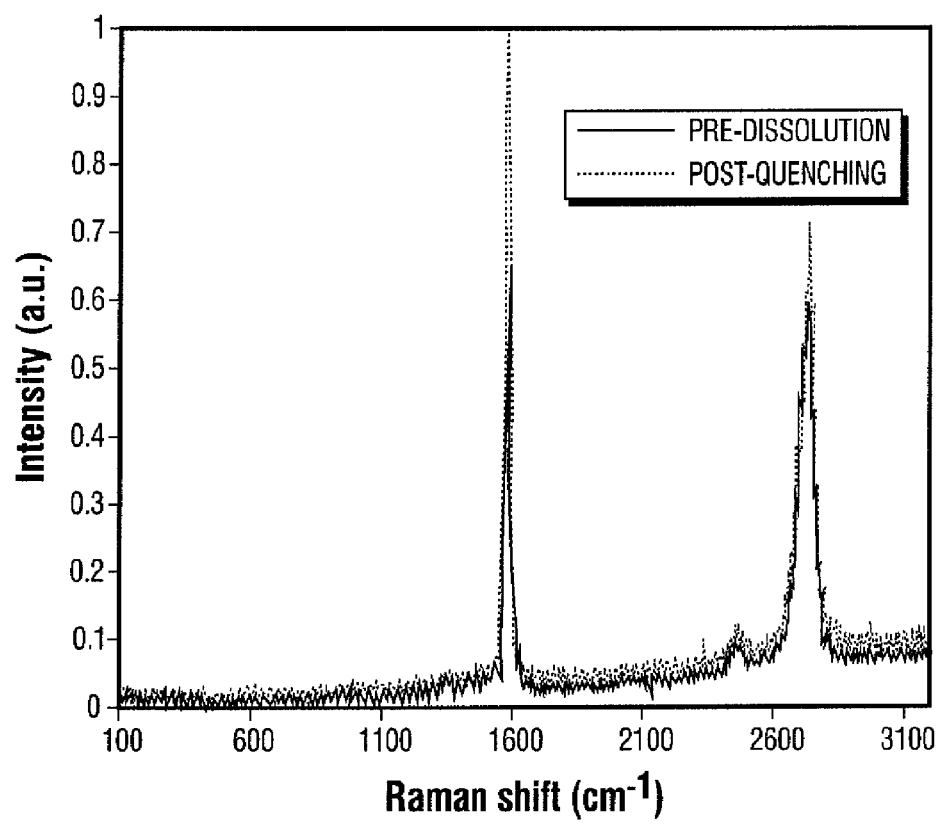
FIG. 4 shows illustrative Raman spectra of graphite before being dissolved in chlorosulfonic acid and after dissolution in chlorosulfonic acid, followed by quenching of the acid.

Again without being bound by theory, Applicants believe that the dissolution mechanism involves protonation of the carbon material. The proposed mechanism is consistent with the steady increase in solubility with increased acid strength noted above. FIG. 3 shows illustrative Raman spectra of graphite dispersed in variable concentrations of chlorosulfonic acid. Protonation in graphene and related materials is indicated by the position of the G peak in the Raman spectrum. The difference in location between the G peak of dry graphite compared to that observed in superacid solutions is a quantitative measure of the positive charge per carbon imparted by the acid. As shown in FIG. 3, 99% chlorosulfonic acid gave the highest separation between the G peaks (i.e., greatest protonation), whereas chlorosulfonic acid concentrations of 50, 65 and 80% gave intermediate protonation, mirroring the corresponding decrease in solubility observed at lower acid concentrations. FIG. 4 shows illustrative Raman spectra of graphite before being dissolved in chlorosulfonic acid and after dissolution in chlorosulfonic acid, followed by quenching of the acid. As shown in FIG. 4, the graphite starting material was unchanged by the chlorosulfonic acid treatment, other than becoming exfoliated to form graphene, and the protonation was a reversible process. Protonation is similarly reversible when graphene nanoribbons are solubilized by chlorosulfonic acid.

In various embodiments, dissolving the carbon material in the solvent containing at least one superacid is accomplished by stirring the carbon material in the solvent. Superacids, particularly chlorosulfonic acid, are an athermal solvent for carbon materials of the present disclosure, and sonication is generally not required to affect dissolution. The fact that superacid solutions of the carbon materials can be prepared in the absence of sonication is advantageous for achieving larger particle sizes of the carbon materials dispersed in solution. Sonication can break up the particles into much smaller sizes in achieving dissolution.

Figure 5:
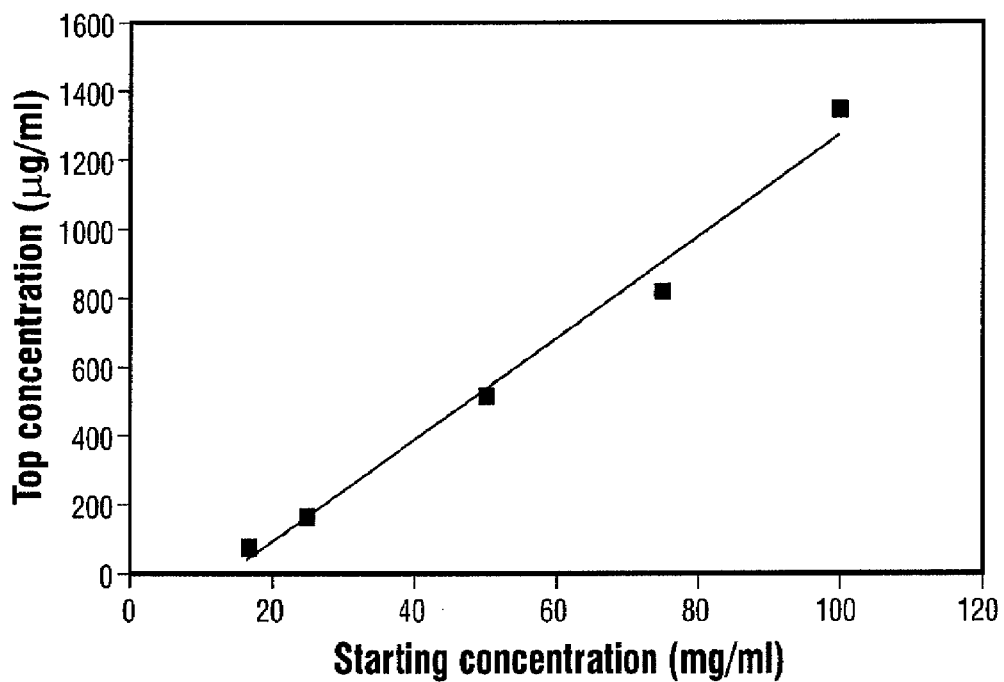
FIG. 5 shows an illustrative plot of dissolved graphite concentration in chlorosulfonic acid versus starting graphite concentration.
Figure 6A:
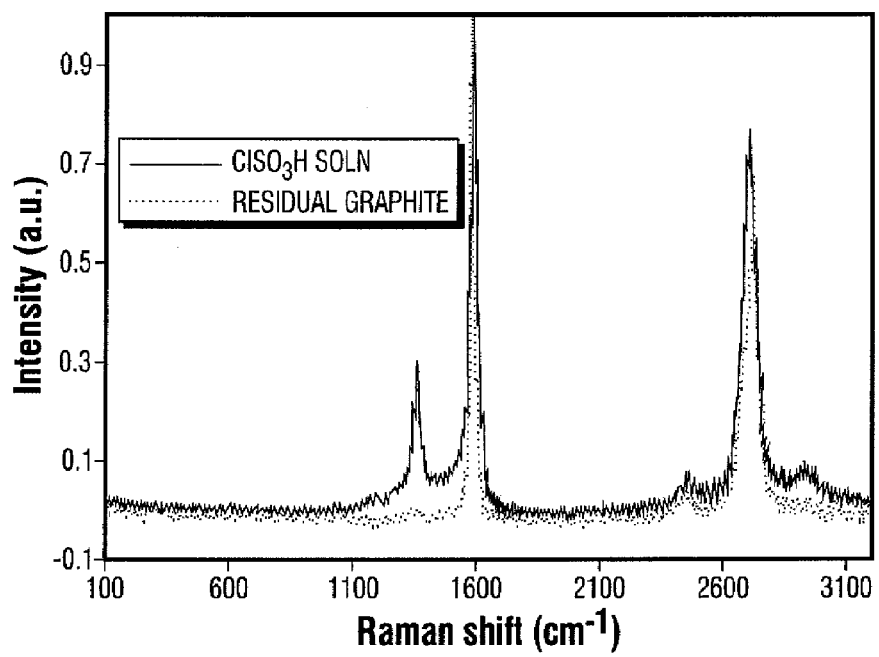
FIG. 6A shows illustrative Raman spectra from the top phase of a graphite solution in chlorosulfonic acid and undissolved graphite remaining after centrifugation.
Figure 6B:
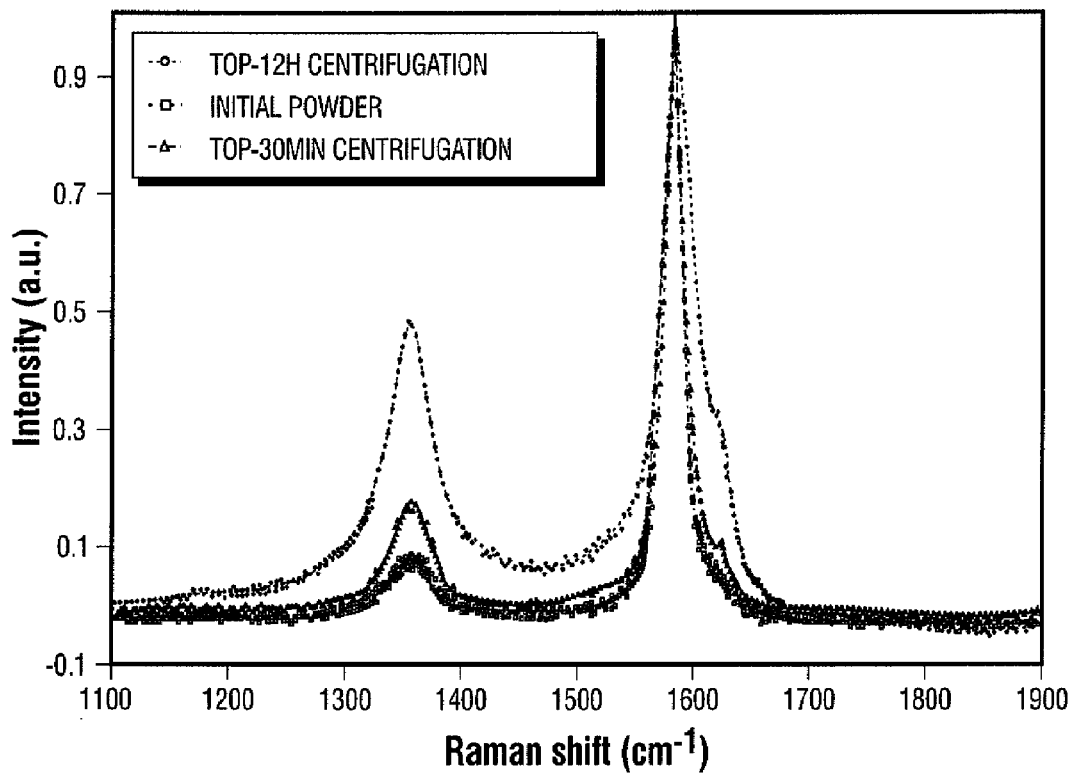
FIG. 6B illustrative Raman spectra for the top phase of the chlorosulfonic acid solution of graphite after various centrifugation times in comparison to pristine graphite.

In some embodiments, methods of the present disclosure further include centrifuging the solution after dissolving the carbon material and then separating the solution from any undissolved carbon material thereafter. Generally, when graphite is dissolved in a solution containing at least one superacid, at least a small amount of residual solid graphite remains undissolved, even below the saturation solubility. FIG. 5 shows an illustrative plot of dissolved graphite concentration in chlorosulfonic acid versus starting graphite concentration. Top concentration in the y-axis label of FIG. 5 refers to the concentration of dispersed graphite in the form of graphene present in the chlorosulfonic acid solution. As shown in FIG. 5, the amount of graphite dissolved in the chlorosulfonic acid solution is dependent on the amount of graphite initially mixed with the chlorosulfonic acid. As an example, FIG. 5 shows a maximum top concentration of about 1400 µg/mL (1.4 mg/mL) at the highest starting concentration tested (100 mg/mL). This value is not to be regarded as the solubility limit of graphite in chlorosulfonic acid. For example, using the top phase of a chlorosulfonic acid solution of extracted microcrystalline graphite, an isotropic equilibrium concentration of 1.8 mg/mL can be reached at a starting concentration of 20 mg/mL. Higher or lower equilibrium concentrations can be achieved based on the particle size of the starting graphite, its polydispersity and the starting concentration. FIG. 6A shows illustrative Raman spectra from the top phase of a graphite solution in chlorosulfonic acid and undissolved graphite remaining after centrifugation. The D band of the graphite from the top part of the chlorosulfonic acid solution was higher than that of the undissolved graphite. The increase in D band intensity is believed to be due to smaller graphene flake sizes induced by centrifugation. Further, the Raman spectrum of the undissolved graphite was indistinguishable from that of pristine graphite. Additional characterization of the graphene obtained by exfoliation of graphite in chlorosulfonic acid is presented in the experimental examples. Furthermore, the D band intensity of the top phase of the chlorosulfonic acid solution of graphite increases as a function of centrifugation time as shown in FIG. 6B. FIG. 6B illustrative Raman spectra for the top phase of the chlorosulfonic acid solution of graphite after various centrifugation times in comparison to pristine graphite.

Figure 7:
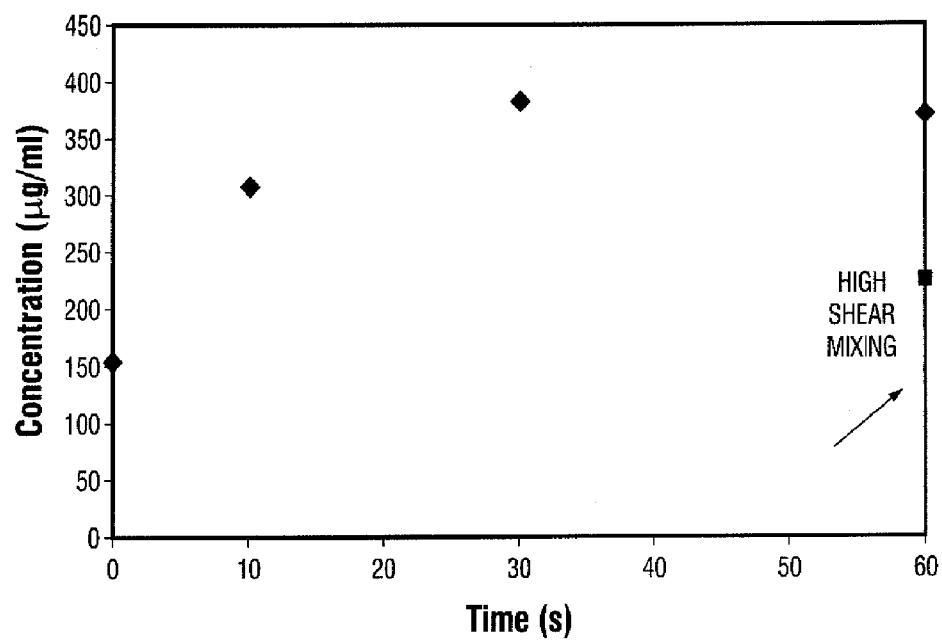
FIG. 7 shows an illustrative plot demonstrating the influence of sonication or high shear mixing on dissolution of graphite in a superacid solution.

In other embodiments of the present disclosure, the carbon material may be dissolved in the solution containing at least one superacid through the aid of sonication or high shear mixing. Although sonication or high shear mixing may result in smaller dissolved particle sizes of the carbon material, higher concentrations of the carbon material in the solution may be attained than with stirring alone. FIG. 7 shows an illustrative plot demonstrating the influence of sonication or high shear mixing on dissolution of graphite in a superacid solution. For example, at time zero (i.e, no sonication or high shear mixing), a solution concentration of 150 µg/mL was attained. However, for 10 to 60 seconds of sonication, the solution concentration was more than doubled. High shear mixing for 60 seconds produced a small, but much less significant increase in solution concentration.

In some embodiments, methods of the present disclosure further include mixing the solution with a polymer after dissolving the carbon material and then removing the solvent from the polymer to form a composite material. The composite material includes the polymer and the carbon material. In some embodiments, rather than mixing the solution with a polymer, the solution may be mixed with a monomer or other non-polymeric material. In such embodiments, the monomer may be subsequently polymerized to produce a composite material containing polymer and the carbon material. Polymers suitable for being mixed with the solutions herein containing carbon materials include, for example, thermoplastic polymers, including high performance polymers such as, for example, poly(p-phenylene terephthalamide) (PPTA), poly(p-phenylenebenzobisoxazole) (PBO) and poly {2,6-diimidazo[4,5-b:4',5'-e]pyridinylene-1,4-(2,5-dihydroxy)phenylene}(M5). However, mixing of the carbon material into any polymer that is not degraded by the superacid in the solution lies within the spirit and scope of the present disclosure. In some embodiments, composite materials of the present disclosure have exfoliated carbon materials dispersed within their matrix. The presence of dispersed and exfoliated carbon materials advantageously assures good mechanical properties and low percolation thresholds.

In some embodiments, methods of the present disclosure further include functionalizing the carbon material while in the solution containing at least one superacid. Since the carbon materials are exfoliated in the solutions of the present disclosure, functionalization may be achieved more easily than for the native carbon material to form a uniformly functionalized carbon material. For carbon materials that are not exfoliated, inner portions of the carbon material may not be accessible to a reactant and are not functionalized when reacted. Functionalization may be accomplished through any method that is compatible with the solvent containing at least one superacid.

In some embodiments, methods of the present disclosure further include forming an article from the solution containing at least one superacid and then removing the solvent from the article. The article includes a neat form of the carbon material. In some embodiments, forming the article takes place by a process such as, for example, extruding the solution through a spinneret, extruding the solution through a needle, extruding the solution through a film die, spreading the solution into a film, or casting the solution into a mold. In some embodiments, removing the solvent takes place through a process such as, for example, coagulation, evaporation, or heating under vacuum. Processing techniques similar to those above are described in more detail in commonly-assigned published application WO 09/058,855 entitled "NEAT CARBON NANOTUBE ARTICLES PROCESSED FROM SUPER ACID SOLUTIONS AND METHODS FOR PRODUCTION THEREOF", which is incorporated herein by reference in its entirety. Further disclosure concerning formation of articles from the carbon material solution containing at least one superacid is set forth hereinbelow.

In some embodiments, methods described herein include providing a carbon material such as, for example, graphite, graphite oxide, oxidized graphene nanoribbons or reduced graphene nanoribbons and dissolving the carbon material in a solvent to form an isotropic solution. The solvent includes at least one superacid.

Carbon materials of the present disclosure may be dissolved in a solution containing at least one superacid to form a solution that is either isotropic or liquid crystalline depending on the concentration of carbon material in the solution. For example, at low concentrations up to about 1 wt % (~2 mg/mL), carbon materials of the present disclosure may form an isotropic solution in a superacid. The isotropic solutions contain exfoliated carbon material dispersed in the solution. Such isotropic solutions may be further utilized, for example, for mixing the carbon material with a polymer or non-polymeric material, forming thin films of the carbon material, or functionalizing the carbon material. In some embodiments of the present disclosure, the isotropic solutions are mixed with a polymer and the solvent is then removed from the polymer to form a composite material containing the polymer and the carbon material. In some embodiments, the carbon material in the composite material is exfoliated and dispersed. In some embodiments, the isotropic solutions are deposited on a surface and the solvent is then removed to form a film of the carbon material on the surface. In some embodiments, such films may be detached from the surface and transferred to another surface, if desired. In still other embodiments, isotropic solutions of the present disclosure may be used for functionalizing the carbon material while the carbon material is in the solution.

In other embodiments, methods described herein include providing a carbon material such as, for example, graphite, graphite oxide, oxidized graphene nanoribbons or reduced graphene nanoribbons and dissolving the carbon material in a solvent to form a liquid crystalline solution. The solvent includes at least one superacid.

In various embodiments, methods of the present disclosure in which a liquid crystalline solution is formed may further include forming an article containing a neat form of the carbon material and then removing the solvent from the article. In some embodiments, the article is a fiber. In some embodiments, forming the article takes place by a process such as, for example, extruding the solution through a spinneret, extruding the solution through a needle, extruding the solution through a film die, spreading the solution into a film, or casting the solution into a mold. In some embodiments, removing the solvent takes place through a process such as, for example, coagulation, evaporation or heating under vacuum.

At higher concentrations, a liquid crystalline solution forms when the carbon material is dissolved in a superacid solution. For example, at about 4 to 5 wt. % (~80-100 mg/mL) and greater, a liquid crystalline solution is formed when a carbon material is dissolved in chlorosulfonic acid solutions. However, the concentration at which the liquid crystalline solutions are formed may be strongly influenced, for example, by the size of carbon material particles being dissolved. At intermediate concentrations, there may be solutions formed that have both isotropic and liquid crystalline phases. High concentration liquid crystalline solutions of carbon materials are most beneficial for forming articles containing a neat form of the carbon material. However, one of ordinary skill in the art will recognize that the liquid crystalline solutions described herein may also be used in the aforementioned applications for isotropic solutions. Depending on the concentration of the carbon material in the solution, liquid crystalline regions of different domain size can be formed. An upper concentration limit of the superacid solutions of the carbon materials is only set by working viscosity limits for any apparatus used to process the solution.

Figure 8A:
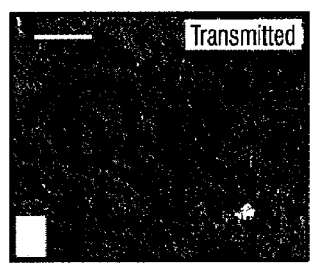
FIGS. 8A-8C show illustrative optical microscopy and polarized light microscopy images of a ~2 wt. % graphite solution in chlorosulfonic acid.
Figure 8B:
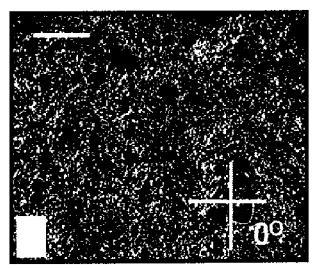
Figure 8C:
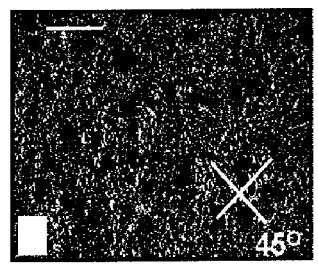
Figure 9A:
FIGS. 9A-9C show illustrative optical microscopy and polarized light microscopy images of a ~2 wt. % solution of oxidized graphene nanoribbons in chlorosulfonic acid.
Figure 9B:
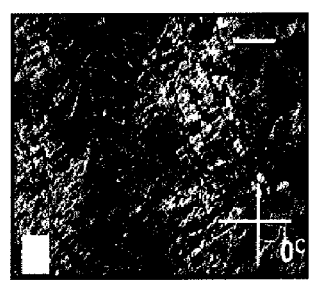
Figure 9C:
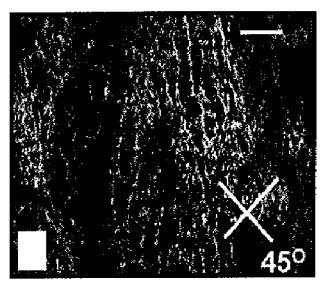
Figure 10A:
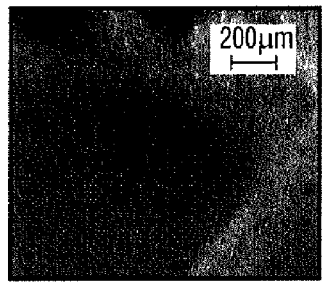
FIGS. 10A-10C show illustrative optical microscopy and polarized light microscopy images of a ~2 wt. % solution of reduced graphene nanoribbons in chlorosulfonic acid.
Figure 10B:
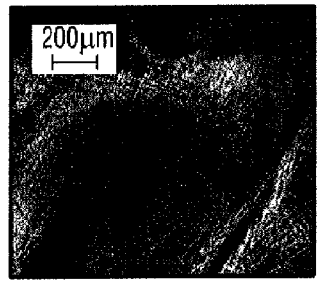
Figure 10C:
Figure 11A:
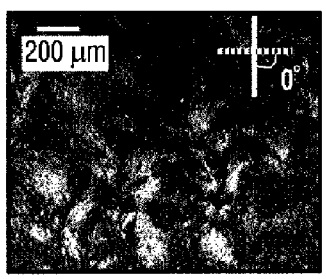
FIGS. 11A-11F show illustrative polarized light microscopy images of oxidized graphene nanoribbons in chlorosulfonic acid at concentrations of 8, 12 and 15 wt. %.
Figure 11B:
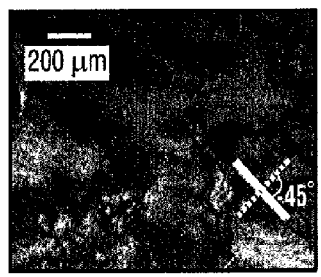
Figure 11C:
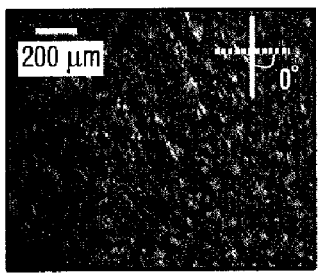
Figure 11D:
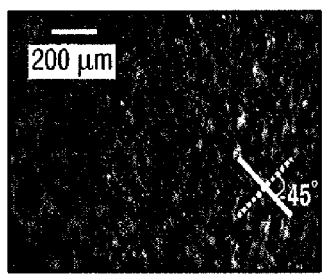
Figure 11E:
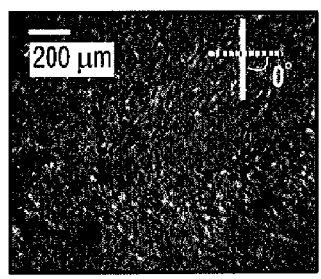
Figure 11F:
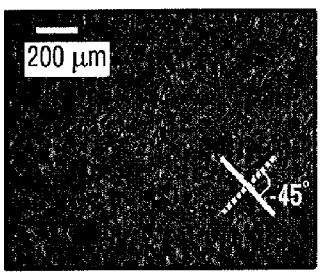

Polarized light microscopy may be used to establish that graphite, graphite oxide, oxidized graphene nanoribbons and reduced graphene nanoribbons form liquid crystalline solutions. FIGS. 8A-8C show illustrative optical microscopy (FIG. 8A) and polarized light microscopy images (FIGS. 8B and 8C) of a ~2 wt. % graphite solution in chlorosulfonic acid. FIG. 8B has the polarizer and the analyzer crossed at 90° relative to one another, whereas in FIG. 8C the angle is 45°. The polarized light microscopy images show clear birefringence that is characteristic of liquid crystalline domains. FIGS. 9A-9C show illustrative optical microscopy (FIG. 9A) and polarized light microscopy images (FIGS. 9B and 9C) of a ~2 wt. % solution of oxidized graphene nanoribbons in chlorosulfonic acid. FIGS. 10A-10C show illustrative optical microscopy (FIG. 10A) and polarized light microscopy images (FIGS. 10B and 10C) of a ~2 wt. % solution of reduced graphene nanoribbons in chlorosulfonic acid. The polarized light microscopy images of oxidized and reduced graphene nanoribbons likewise demonstrate formation of liquid crystalline domains for chlorosulfonic acid solutions of these carbon materials. FIGS. 11A-11F show illustrative polarized light microscopy images of oxidized graphene nanoribbons in chlorosulfonic acid at concentrations of 8 (FIGS. 11A and 11B), 12 (FIGS. 11C and 11D) and 15 (FIGS. 11E and 11F) wt. %, which demonstrate that liquid crystallinity is maintained at even higher concentrations.

In addition to the aforementioned solubility in chlorosulfonic acid, Applicants have found that oxidized graphene nanoribbons are exceedingly soluble in oleum, as well as several common organic solvents and water. In contrast, graphite is insoluble in oleum and these other solvents.

In various embodiments, articles of the present disclosure are formed through coagulation of the solution following extrusion or molding. The microstructure and properties of the article can dramatically change depending both on the coagulant used and the rate of diffusion of the coagulant into the article and the rate of diffusion of the solvent from the article into the coagulant. Coagulants may vary without limitation. In various embodiments, the coagulant may be, for example, ether, diethyl ether, poly(ethylene glycol), dimethyl sulfoxide, poly(vinyl alcohol), sulfuric acid, water, dichloromethane, chloroform, tetrachloroethane, n-propyl bromide, Triton-X, and polymerizable monomers and mixtures thereof. Aqueous sulfuric acid concentrations may range from about 5% $H_2SO_4$ in water to about 95% $H_2SO_4$ in water. In some embodiments, the coagulant may be a polymer or polymerizable monomer soluble in organic solvents (e.g., chloroform or dichloromethane). Illustrative polymerizable monomers include, for example, vinyl pyrrolidone and vinyl alcohol.

In various embodiments, extruding of the carbon material solutions may be conducted using a technique such as, for example, wet-jet wet spinning, dry-jet wet spinning and coagulant co-flow. Each of these extrusion processes are described in more detail in WO 09/058,855.

Figure 12A:
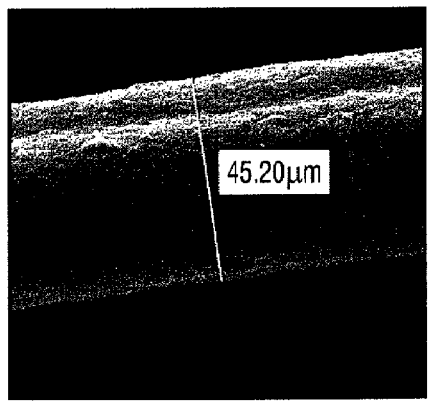
FIG. 12A shows an illustrative SEM image of a fiber spun from an 8 wt. % solution of oxidized graphene nanoribbons in chlorosulfonic acid.
Figure 12B:
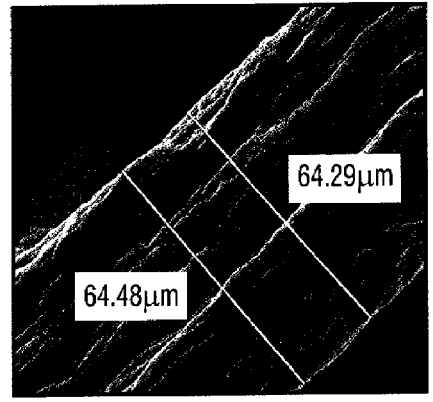
FIG. 12B shows an illustrative SEM image of a comparable single-wall carbon nanotube fiber spun from a 7 wt. % solution of single-wall carbon nanotubes in chlorosulfonic acid.

Scanning electron microscopy (SEM) imaging may be used to demonstrate that fibers spun from a superacid solution of carbon materials may have a different morphology than fibers spun from a comparable solution of carbon nanotubes. FIG. 12A shows an illustrative SEM image of a fiber spun from an 8 wt. % solution of oxidized graphene nanoribbons in chlorosulfonic acid. FIG. 12B shows an illustrative SEM image of a comparable single-wall carbon nanotube fiber spun from a 7 wt. % solution of single-wall carbon nanotubes in chlorosulfonic acid. As can be seen in FIGS. 12A and 12B, oxidized graphene nanoribbons produced a fiber having a much smoother morphology than a comparably-produced fiber made from single-wall carbon nanotubes. For the fibers shown in FIGS. 12A and 12B, the chlorosulfonic acid was removed using ether as a coagulant. Comparable fiber morphology was observed for fibers formed from 12 and 15 wt. % oxidized graphene nanoribbons in chlorosulfonic acid.

In various embodiments, articles of the present disclosure may be further processed after removal of the solvent. In some embodiments, processing may take place through an article treatment such as, for example, heating, heating under vacuum, heating in air, or heating in $H_2$. Annealing by heating under vacuum or in air may allow densification and smoothing of the article after its formation. In some embodiments, annealing may result in formation of covalent bonds between individual particles of the carbon material. In embodiments where the article is annealed in $H_2$, the $H_2$ may reduce at least a portion of any oxidized carbon material back into its pristine or unoxidized (i.e., carbon-carbon double bonded) state.

Table 1 summarizes the mechanical properties of fibers made from oxidized graphene nanoribbons in chlorosulfonic acid at various concentrations, both before and after annealing the fiber. Annealing was conducted by heating the fiber up to 1300° C. under Ar.

|  | Oxidized Graphene Nanoribbon Fiber | | | Oxidized Graphene Nanoribbon Fiber After Annealing | | |
| --- | --- | --- | --- | --- | --- | --- |
|  | 8 wt. % | 12 wt. % | 15 wt. % | 8 wt. % | 12 wt. % | 15 wt. % |
| Diameter (μm) | 87.9 | 72.0 | 86.0 | 59.2 | 50.6 | 56.2 |
| Tensile Strength (MPa) | 13.5 | 26.4 | 14.3 | 157.1 | 307.2 | 167.5 |
| Tensile Modulus (GPa) | 1.19 | 2.58 | 1.44 | 22.9 | 29.2 | 21.7 |
| Strain to Failure (%) | 1.33 | 1.33 | 1.32 | 0.68 | 1.03 | 0.75 |

Figure 13:
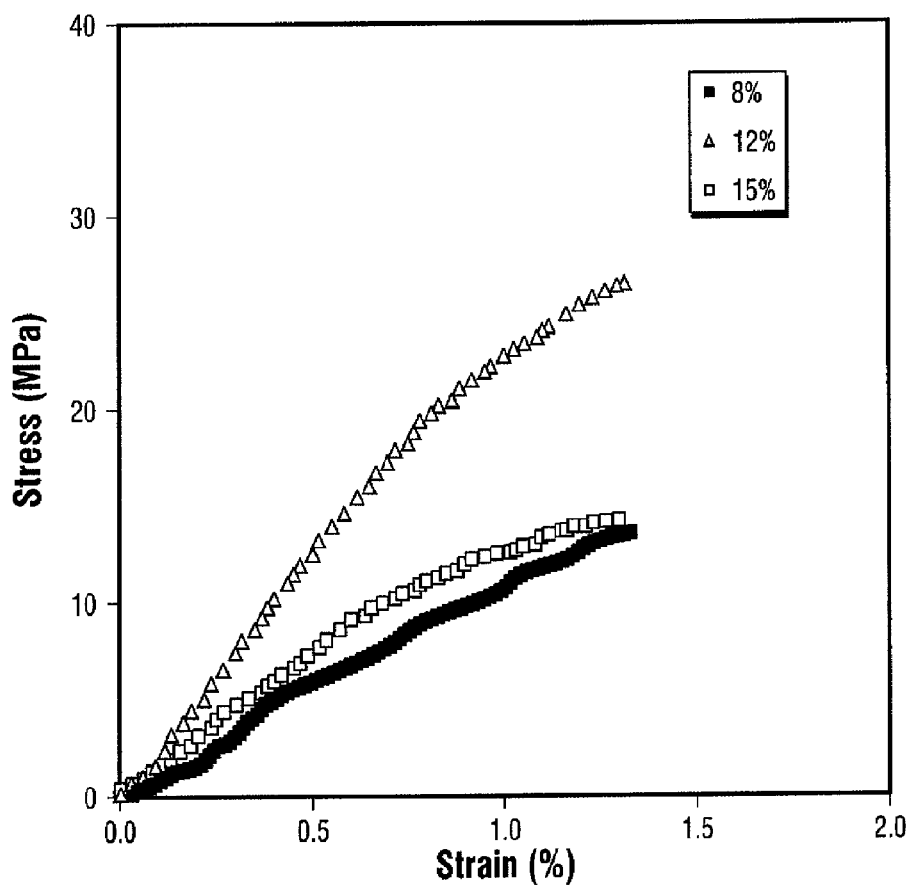
FIG. 13 shows an illustrative stress versus strain plot for fibers made from oxidized graphene nanoribbons.
Figure 14:
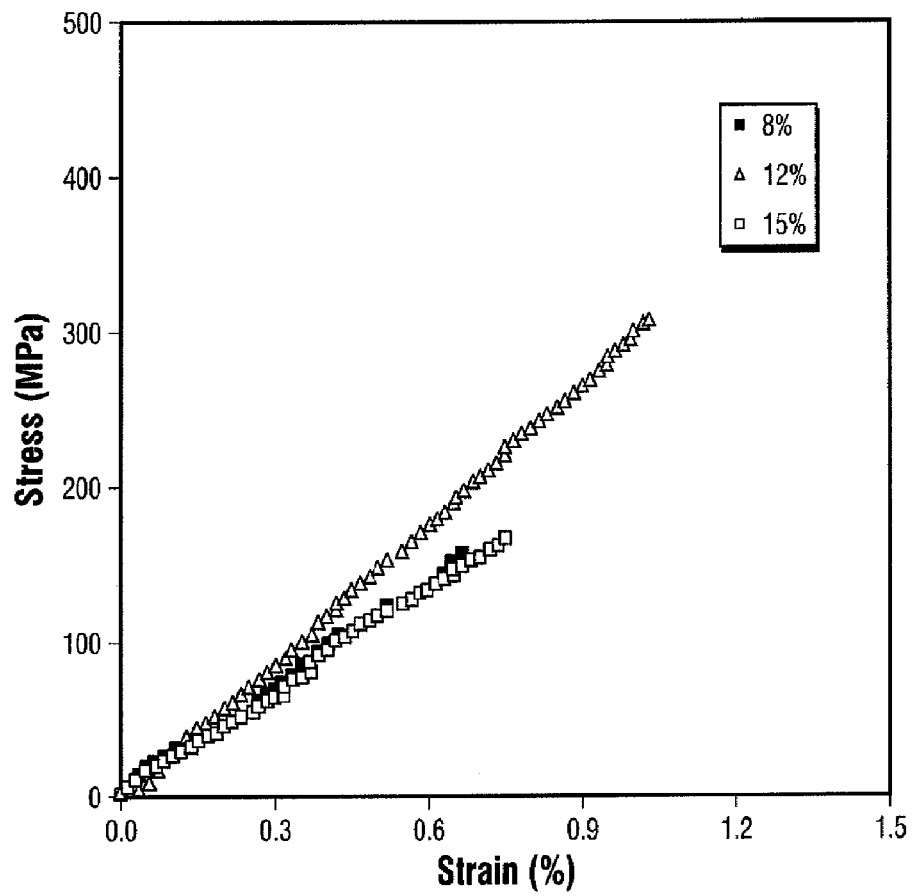
FIG. 14 shows an illustrative stress versus strain plot for annealed fibers made from oxidized graphene nanoribbons.

FIG. 13 shows an illustrative stress versus strain plot for fibers made from oxidized graphene nanoribbons. FIG. 14 shows an illustrative stress versus strain plot for annealed fibers made from oxidized graphene nanoribbons.

Figures 15A, 15B, 15C:
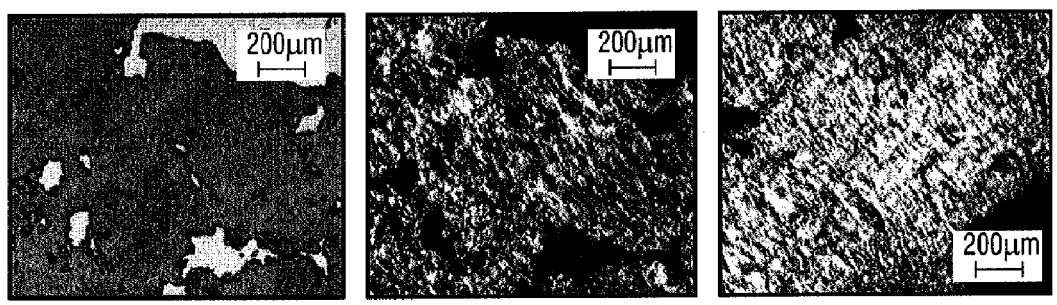
FIGS. 15A-15C show illustrative optical microscopy and polarized light microscopy images of oxidized graphene nanoribbons dissolved water at a concentration of 19 wt. %.

As previously mentioned hereinabove, oxidized graphene nanoribbons are soluble in solvents other than superacids such as, for example, water and other common organic solvents. In some embodiments, methods of the present disclosure include providing oxidized graphene nanoribbons, dissolving the oxidized graphene nanoribbons in a solvent to form a liquid crystalline solution, forming an article from the liquid crystalline solution and removing the solvent from the article. The article includes a neat form of the carbon material. In some embodiments, the solvent is water. In some embodiments, the article is a fiber. FIGS. 15A-15C show illustrative optical microscopy (FIG. 15A) and polarized light microscopy (FIGS. 15B and 15C) images of oxidized graphene nanoribbons dissolved water at a concentration of 19 wt. %. FIG. 15B has the polarizer and the analyzer crossed at 90° relative to one another, whereas in FIG. 15C the angle is 45°. The polarized light microscopy images show clear birefringence that is characteristic of liquid crystalline domains.

FIG. 16 shows an illustrative SEM image of a fiber spun from a 19 wt. % oxidized graphene nanoribbon solution in water. The fiber was spun from a 175 micron spinneret and dried by evaporating the water at 100° C. The fiber had a modulus of 24 GPa and a tensile strength of 64 MPa. Referring to Table 1, it can be seen that these values are intermediate between oxidized graphene nanoribbons fibers spun from chlorosulfonic acid solutions with and without annealing.

In still other various embodiments, methods of the present disclosure also include dissolving graphite in a solvent to form a graphene solution. The solvent includes at least one superacid. Dissolution results in exfoliation of the graphite to form the graphene. In some embodiments, the methods further include removing the solvent and isolating the graphene. In some embodiments, removing the solvent may be accomplished by adding excess water to the solution, which results in precipitation of the graphene. Isolation of the graphene may then be conducted by techniques such as, for example, filtration or centrifugation.

In still other various embodiments, methods of the present disclosure also include dissolving graphite oxide in a solvent to form an oxidized graphene solution. The solvent includes at least one superacid. Dissolution results in exfoliation of the graphite oxide to form the oxidized graphene. In some embodiments, the methods further include removing the solvent and isolating the oxidized graphene. For example, in some embodiments, removing the solvent may be accomplished by adding excess water or another solvent to the solution, which results in precipitation of the oxidized graphene. Isolation of the oxidized graphene may then be conducted by techniques such as, for example, filtration or centrifugation.

Both of these methods described immediately hereinabove are advantageous for producing bulk amounts of graphene or graphene oxide. As they are solution-based methods, they are easily scaleable to produce any desired quantity of graphenic material.

In some embodiments, the present disclosure describes solutions containing a solvent and a carbon material dissolved in the solvent. The solvent includes at least one superacid, and the carbon material can be, for example, graphite, graphite oxide, oxidized graphene nanoribbons or reduced graphene nanoribbons. In some embodiments, the carbon material is exfoliated by the solvent to de-aggregate the carbon material. In some embodiments, the solution is an isotropic solution. In other embodiments, the solution is a liquid crystalline solution.

In other various embodiments, the present disclosure describes solutions of oxidized graphene nanoribbons dissolved in water in which the concentration of oxidized graphene nanoribbons is chosen such that the solution is at least partially liquid crystalline. Hence, the present disclosure shows that liquid crystalline solutions of carbon materials may be formed in solvents other than those containing a superacid.

In additional embodiments, the present disclosure describes articles formed from exfoliated carbon materials. Exfoliated carbon materials include, for example, graphene, oxidized graphene, oxidized graphene nanoribbons, or reduced graphene nanoribbons. The exfoliated carbon materials may be produced by any of the methods described hereinabove. In various embodiments, the article is a film. In other various embodiments, the article is a fiber. In some embodiments, articles may consist essentially of the exfoliated carbon material. In other embodiments, the article may include other components such as, for example, fillers and additives in addition to the exfoliated carbon material.

EXPERIMENTAL EXAMPLES

The following examples are provided to more fully illustrate some of the embodiments disclosed hereinabove. It should be appreciated by those of ordinary skill in the art that the techniques disclosed in the examples that follow represents techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

Preparation of Chlorosulfonic Acid Solutions of Graphene from Graphite

Chlorosulfonic acid solutions of graphene were prepared from three different graphite sources: (1) GRAPHOIL (expanded graphite, EGS Enterprises, Inc), (2) microcrystalline graphite (Sigma Aldrich batch #08017EH), and (3) highly ordered pyrolytic graphite (SPI Supplies Lot #1091028). Graphite samples were dissolved in either pure chlorosulfonic acid or mixtures of chlorosulfonic acid/sulfuric acid.

The solutions were prepared as follows: The initial graphite powder was placed in vials and dried overnight in a vacuum oven to minimize moisture content. The vials were then transferred into a dry glove box (dew point of −50° C.) and flushed with dry air for 12 hours. The acid or mixture of acids was then added via glass syringe, and the solution was mixed with a magnetic stirbar for 3 days. Thereafter, the vials were centrifuged at 5100 rpm for 12 hours in a benchtop centrifuge. The vials were then retransferred into the glove box, and the top phase was separated from any remaining bottom insoluble phase.

Separation of solid samples of carbon material from the solution was achieved by adding excess water to the superacid solution (CAUTION: exothermic reaction, personal protective equipment required). Upon addition of excess water, the solid carbon material precipitated from solution and was isolated by filtration or centrifugation.

Example 2

Figure 18A:
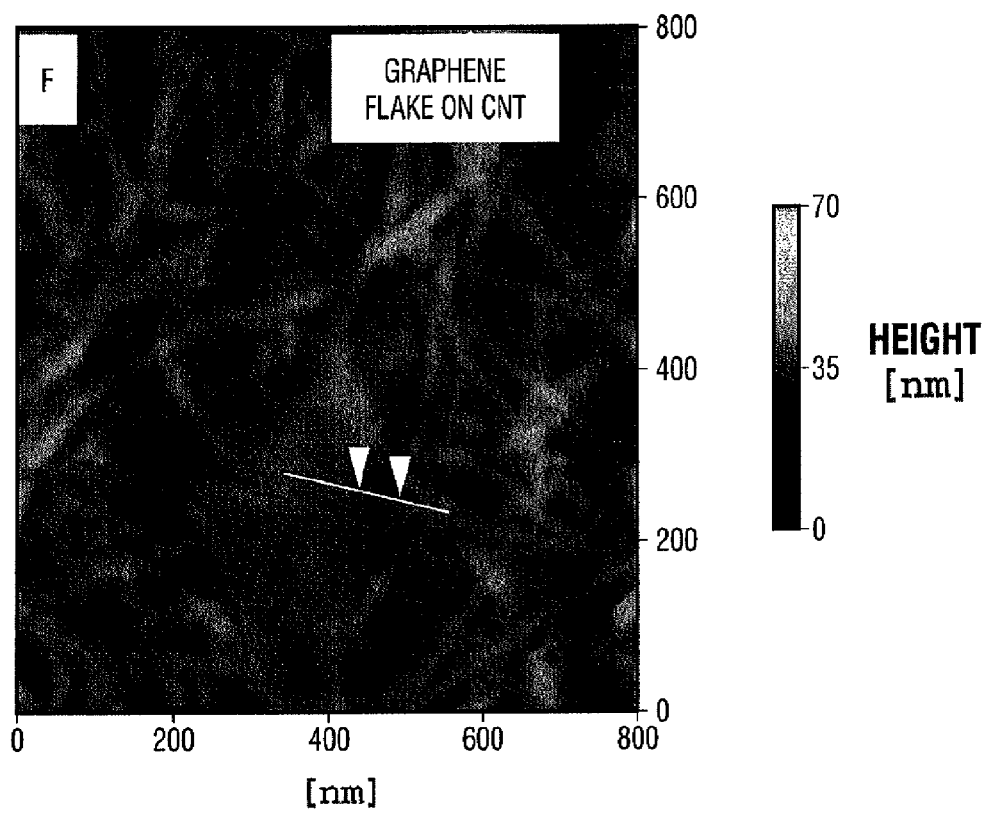
FIGS. 18A and 18B show an illustrative AFM image and height profile of exfoliated graphene in chlorosulfonic acid when filtered upon a bed of single-walled carbon nanotubes.
Figure 18B:
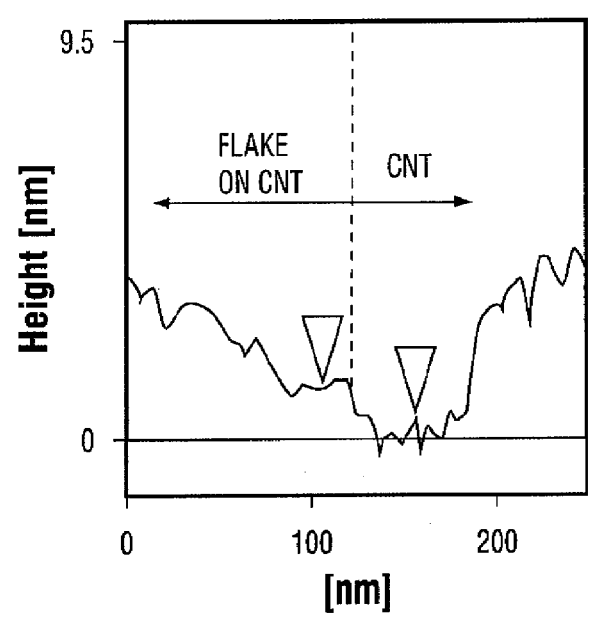

Size Characterization of Graphene from Exfoliation of Graphite in Chlorosulfonic Acid Evidence that graphite was exfoliated to graphene in the chlorosulfonic acid solutions was provided by transmission electron microscopy (TEM) and atomic force microscopy (AFM). For TEM and AFM, the graphene samples were deposited on a custom-made grid consisting of single-wall carbon nanotubes, since conventional TEM grids and AFM substrates are incompatible with chlorosulfonic acid. FIGS. 17A-17C show illustrative TEM images of exfoliated graphene in chlorosulfonic acid when filtered upon a bed of single-walled carbon nanotubes. FIGS. 17A and 17B show a single-layer graphene flake, whereas FIG. 17C shows a few-layer graphene flake. In each case the single-wall carbon nanotube grid is visible through the graphene layer. FIGS. 18A and 18B show an illustrative AFM image and height profile of exfoliated graphene in chlorosulfonic acid when filtered upon a bed of single-walled carbon nanotubes. Although the single-wall carbon nanotube grid yields a rough background surface, the step height of 0.5 nm in the height profile is indicative of single-layer graphene. As analyzed, greater than 70% of the observed graphene flakes were single layer, with the remainder being few layer (i.e., <10 carbon layers). Depending on the graphite source, the average graphene flake size ranged from about 300 nm to about 900 nm.

Example 3

Thin Film Preparation from a Graphene Solution in Chlorosulfonic Acid

Thin films were made via vacuum filtration of the graphene solution on a Teflon filter substrate (pore size 0.2 μm). The mass of deposited graphene was calculated by weighing the filter before and after filtration. The resistance of the film was measured using a four-point probe. Sheet resistivity was calculated using Formula (I)

$$\rho=(V/I)\pi t/\ln(2) \quad (1)$$

where $\rho$ is resistivity, V is voltage, I is current, and t is the film thickness. Thickness was calculated by dividing the known mass by the density of graphite (assumed to be 2.1 g/cm$^3$) multiplied by the filter area, assuming uniform coverage. The resistivity of a film produced from GRAPHOIL was 9.1 μΩm, whereas the resistivity produced from microcrystalline graphite was 633.6 μΩm. FIGS. 19A and 19B show illustrative SEM images of thin graphene films produced from GRAPHOIL and microcrystalline graphite. As shown in the SEM images, there is clearly a difference in graphene particle size between the two films.

Transparent and conducting thin films were also made using both GRAPHOIL and highly ordered pyrolytic graphite dispersions in chlorosulfonic acid. Very thin films (~10 nm thickness) were prepared by vacuum filtration of isotropic graphite dispersions on to alumina filters (Whatman anodise, 47 mm, 0.02 μm pore size). Chloroform was then added to quench and remove residual chlorosulfonic acid. Chloroform is miscible with chlorosulfonic acid and has a small heat of mixing, which makes it an effective solvent for removing chlorosulfonic acid. In order to transfer the film on the alumina filter to another substrate such as glass, the alumina was detached from the thin film by simply immersing the filter into water. A thin film having a sheet resistance of 1000Ω/□ and 80% transparency was prepared from a 10 ppm GRAPHOIL dispersion in chlorosulfonic acid. The square box in the unit Ω/□ is a standard notation used to express sheet resistance of transparent and conducting thing films. Resistance of the thin films samples was measured using a Alessi four-point probe fitted with custom-made film attachment with Pt leads. Measurements were taken in ambient conditions by securing and pressing the graphene thin films on a glass substrate against the Pt leads. FIG. 20 shows an image of an illustrative transparent thin film prepared from a graphite solution in chlorosulfonic acid.

Example 4

Figure 21:
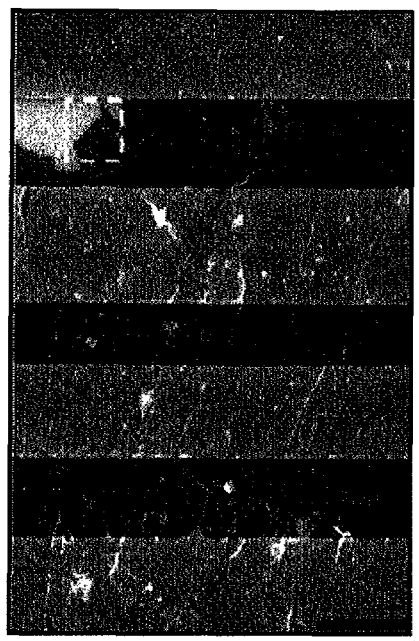
FIG. 21 shows an SEM image of an illustrative four-terminal electronic device containing a graphene film.

Electronic Devices Prepared from Thin Graphene Films Deposited from a Graphene Solution in Chlorosulfonic Acid In order to examine the electronic properties of graphene films prepared by filtration, four-terminal electronic devices were fabricated by standard e-beam lithography techniques. FIG. 21 shows an SEM image of an illustrative four-terminal electronic device containing a graphene film. In a typical procedure, thin graphene films were prepared by vacuum filtration onto alumina membranes (Anodise 47, Whatman, 0.02 µM pore size). The thin films were then separated from the membrane by floating the film on water. Dilute sodium hydroxide (~0.1 M) could also be used instead of water since it can dissolve the alumina membrane slowly; however, some alumina tended to remain on the surface of the graphene film in this case. The thin graphene films were taken out of the water by slowly bringing a Si/SiO$_2$ substrate (e.g., heavily doped p-type Si with a 500 nm thermal SiO$_2$ layer) up from underneath the films, and then the substrates were oven-dried at 150° C. for 2 h. After the location of the graphene flakes on the substrate was established by SEM, 30 nm-thick Pd contacts were patterned on top of the flakes by standard e-beam lithography and e-beam evaporation.

Figure 22:
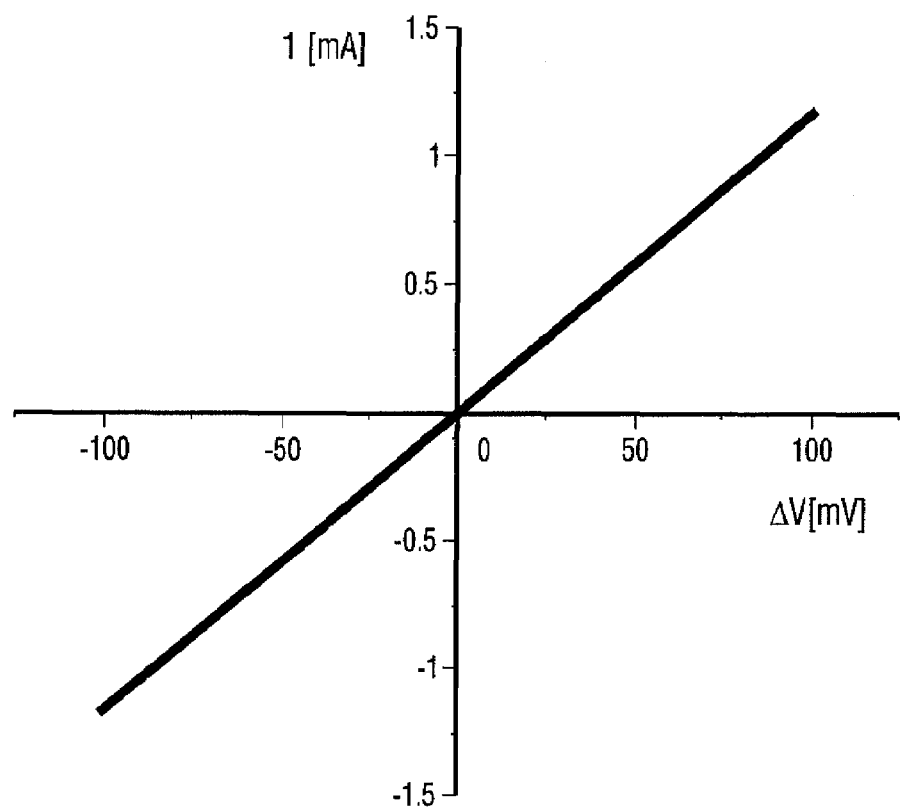
FIG. 22 shows an illustrative plot showing current versus voltage (IV) performance of a 4-terminal electronic device.

FIG. 22 shows an illustrative plot showing current versus voltage (IV) performance of a 4-terminal electronic device of the present disclosure. As shown in FIG. 22, the graphene flakes were highly conductive when deposited as a film. Estimated conductivities of the 4-terminal electronic devices were in the range from $8 \times 10^4$ to $9.5 \times 10^4$ S/m.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A method comprising:
   dissolving graphite oxide in a solvent to form a solution, wherein the solvent comprises at least one superacid,
   wherein the dissolving comprises mixing the graphite oxide in the solvent, and
   wherein the mixing results in exfoliation of the graphite oxide to form an oxidized graphene in the solution.
2. The method of claim 1, further comprising:
   removing the solvent; and
   isolating the oxidized graphene.
3. The method of claim 1, wherein the mixing comprises high shear mixing the graphite oxide in the solvent.
4. The method of claim 1, wherein the mixing comprises sonicating the graphite oxide in the solvent.
5. The method of claim 1, wherein the oxidized graphene comprises from about one layer to about ten layers.
6. The method of claim 1, further comprising:
   providing the graphite oxide.
7. The method of claim 1, wherein the mixing comprises stirring the graphite oxide in the solvent.
8. The method of claim 1, wherein the solvent comprises chlorosulfonic acid.
9. The method of claim 1, wherein the solvent comprises at least chlorosulfonic acid and sulfuric acid.
10. The method of claim 1, further comprising:
    centrifuging the solution; and
    separating the solution from any undissolved graphite oxide.
11. The method of claim 1, further comprising:
    mixing the solution with a polymer; and
    removing the solvent from the polymer to form a composite material;
    wherein the composite material comprises the polymer and the oxidized graphene.
12. The method of claim 1, further comprising:
    forming an article from the solution;
    wherein the article comprises a neat form of the oxidized graphene; and
    removing the solvent from the article.
13. The method of claim 12, wherein forming comprises a process selected from the group consisting of extruding the solution through a spinneret, extruding the solution through a needle, extruding the solution through a film die, spreading the solution into a film, casting the solution into a mold, and combinations thereof.
14. The method of claim 12, wherein removing comprises a process selected from the group consisting of coagulation, evaporation, heating under vacuum and combinations thereof.
15. The method of claim 1, further comprising:
    functionalizing the graphite oxide while in the solution.
16. The method of claim 1, wherein the formed solution is an isotropic solution.
17. The method of claim 16, further comprising:
    mixing the solution with a polymer; and
    removing the solvent from the polymer to form a composite material;
    wherein the composite material comprises the polymer and the oxidized graphene.
18. The method of claim 16, further comprising:
    depositing the solution on a surface; and
    removing the solvent to form a film comprising the oxidized graphene on the surface.
19. The method of claim 16, further comprising:
    functionalizing the graphite oxide while in the solution.
20. The method of claim 1, wherein the formed solution is a liquid crystalline solution.
21. The method of claim 20, further comprising:
    forming an article from the solution;
    wherein the article comprises a neat form of the oxidized graphene; and
    removing the solvent from the article.
22. The method of claim 21, wherein forming comprises a technique selected from the group consisting of extruding the solution through a spinneret, extruding the solution through a needle, extruding the solution through a film die, spreading the solution into a film, casting the solution into a mold, and combinations thereof.
23. The method of claim 21, wherein removing comprises a process selected from the group consisting of coagulation, evaporation, heating under vacuum and combinations thereof.

* * * * *